United States Patent
Shrader et al.

(10) Patent No.: US 6,410,848 B1
(45) Date of Patent: Jun. 25, 2002

(54) HEAT SHRINKABLE SIDE ENTRY CABLE JACKET

(75) Inventors: Vernon L. Shrader, Irvine; Walter A. Plummer, III, Santa Ana, both of CA (US)

(73) Assignee: The Zippertubing Company, Los Angeles, CA (US)

( * ) Notice: Subject to any disclaimer, the term of this patent is extended or adjusted under 35 U.S.C. 154(b) by 0 days.

(21) Appl. No.: 09/556,711

(22) Filed: Apr. 24, 2000

Related U.S. Application Data

(60) Provisional application No. 60/131,923, filed on Apr. 30, 1999, and provisional application No. 60/172,838, filed on Dec. 20, 1999.

(51) Int. Cl.$^7$ ................................................. H01B 11/06
(52) U.S. Cl. .............................................. 174/36; 174/93
(58) Field of Search ........................ 174/93, 36, 35 R, 174/117 F, 102 R

(56) References Cited

U.S. PATENT DOCUMENTS

| | | | |
|---|---|---|---|
| 3,770,556 A | * 11/1973 | Evans et al. ................. 161/39 |
| 3,959,052 A | * 5/1976 | Stanek ......................... 156/86 |
| 4,197,880 A | 4/1980 | Cordia ......................... 138/99 |
| 4,378,393 A | * 3/1983 | Smuckler ..................... 428/99 |
| 4,472,468 A | 9/1984 | Tailor et al. .................. 428/57 |
| 4,521,470 A | * 6/1985 | Overbergh et al. ........... 428/36 |
| 4,559,973 A | * 12/1985 | Hane et al. .................. 138/138 |
| 4,693,767 A | * 9/1987 | Grzanna et al. ............... 156/49 |
| 5,175,032 A | 12/1992 | Steele et al. |
| 5,367,123 A | * 11/1994 | Plummer, III et al. ........ 174/36 |
| 5,421,932 A | * 6/1995 | Fujio .......................... 156/192 |
| 6,005,191 A | * 12/1999 | Tzeng et al. ................. 174/102 |
| 6,064,000 A | * 5/2000 | Kim ............................. 174/36 |
| 6,156,140 A | * 12/2000 | Aryes .......................... 156/66 |

* cited by examiner

Primary Examiner—Dean A. Reichard
Assistant Examiner—William H. Mayo, III
(74) Attorney, Agent, or Firm—Christie, Parker & Hale, LLP

(57) ABSTRACT

A side opening heat shrinkable cable jacket having a tube of heat shrinkable plastic with a longitudinal slit. A stripe of pressure sensitive adhesive borders one edge of the slit on the outside of the tube. The adhesive has sufficient internal cohesion and adhesion to the plastic of the tube to shrink with the tube when heated to the shrinking temperature of the plastic. A release layer covers the stripe of pressure sensitive adhesive. The cable jacket can also have a longitudinally extending strip of electrically conductive fabric bonded to the inside of the tube along an edge of the slit. The conductive fabric strip has a width greater than the inside diameter of the cable jacket when the tube is heat shrunk.

6 Claims, 1 Drawing Sheet

HEAT SHRINKABLE SIDE ENTRY CABLE JACKET

CROSS REFERENCE TO RELATED APPLICATIONS

This application claims priority from U.S. Provisional Application No. 60/131,923 filed Apr. 30, 1999 and U.S. Provisional Application No. 60/172,838 filed Dec. 20, 1999.

BACKGROUND OF THE INVENTION

This invention concerns a heat shrinkable plastic jacket for surrounding a cable, wire harness or the like. A heat shrinkable tube is commonly a rubber or plastic tube which shrinks in all dimensions when exposed to heat. Such tubes are used to protect or fix electric wires or cables inserted within the tube. The tube generally has a seamless tubular shape. The tubes are made of material such polyolefin, Teflon or polyvinyl chloride (PVC) When an electric wire or cable is inserted into the tube and heat is applied, the tube constricts, causing the inner surface of the tube to tightly engage the outside surface of the electric wires within in order to protect and fix them.

A problem with heat shrinkable tubes is that they are difficult to use in connection with extremely long cables or wires. In trying to slide the tube over the cable or wires, the wires can become bunched or difficult to feed to the opposite end of the tube. In addition, feeding the wires or cables through the tube can be a time consuming or complex operation. Consequently a need exists for a newly designed heat shrinkable tube which can be easily installed.

SUMMARY OF THE INVENTION

The present invention is directed to a heat shrinkable plastic jacket for surrounding a cable, wire harness, etc. It is made of heat shrinkable polyolefin (either a homopolymer or copolymer), polyvinyl chloride (which may be plasticized or not), polyvinylidene fluoride fluoropolymer (Kynar) or fluroroelastomer (Viton) tubing which can be placed oversize over a cable and then when heated it shrinks to tightly encompass the cable. Such heat shrinkable materials may be shrunk at temperatures ranging from about 90° C. to 200° C. and are capable of withstanding such temperatures during long term usage.

This invention does not, however, need to have the shrinkable jacket slid lengthwise over the cable. It has a longitudinal slit so that it can be opened and wrapped around the cable and then shrunk to encompass the cable. Such a material may also be used on pipes or over electrical connectors. Furthermore, conductive electromagnetic shielding fabric may be used inside the shielding to avoid electromagnetic interference.

DETAILED DESCRIPTION

Figure 1:
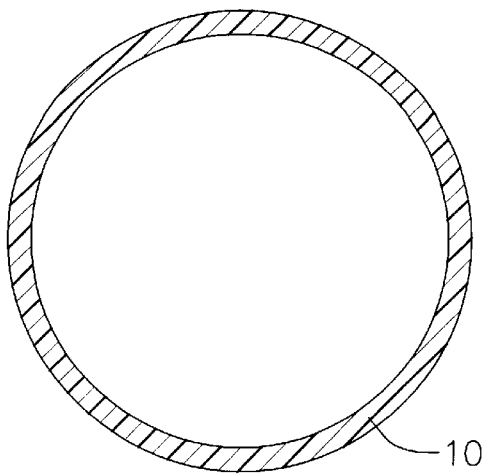
FIG. 1 is a cross-sectional view of the heat shrinkable jacket of the invention in an initial stage in the manufacturing process.

A heat shrinkable side entry cable jacket is made from conventional heat shrinkable tubing 10 as shown in FIG. 1, which is preferably a polyolefin (polypropylene) (homopolymer or copolymer), polyvinylidene fluoride (PVDF) fluoropolymer (Kynar) or fluroroelastomer (Viton) tube since they are more chemical resistant and can withstand higher temperatures than vinyl tubing, for example. The heat shrinkable tubing may be any of the commercially available 2:1, 3:1 or 4:1 shrink ratio tubing products available from a number of vendors. An exemplary tubing conforms to military specification Mil-I-23053/5. The tubing is first cleaned with a suitable solvent. Isopropyl alcohol and organic solvents such as heptane are suitable.

Figure 2:
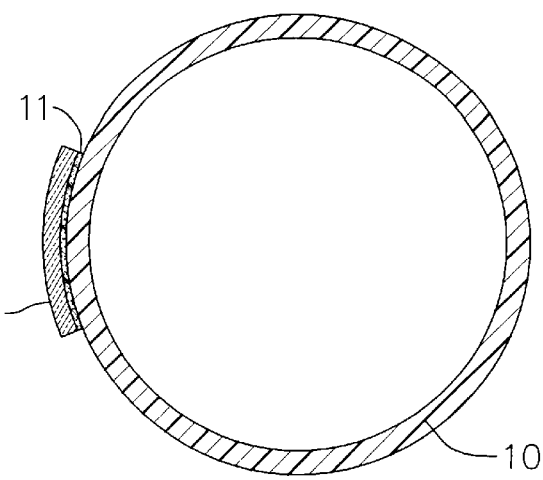
FIG. 2 is the heat shrinkable tube of FIG. 1 having a stripe of pressure sensitive adhesive applied to the tube.
Figure 3:
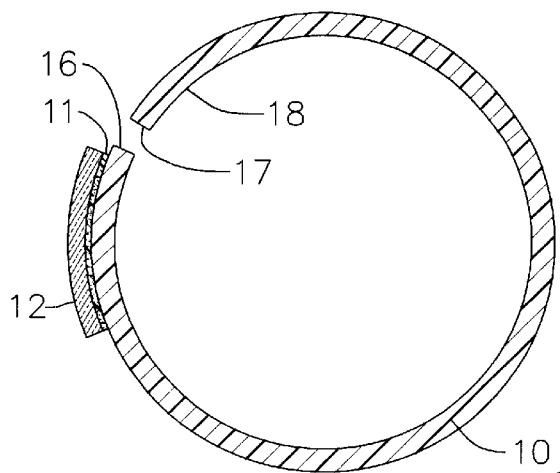
FIG. 3 is a cross-sectional view of the heat shrinkable tube of FIG. 2, having a longitudinal slit near one edge of the adhesive.

As shown in FIG. 2, a stripe of pressure sensitive adhesive 11 is adhesively bonded longitudinally along the outside surface of the tube. The outside of the pressure sensitive adhesive (PSA) is covered with a conventional kraft paper release layer 12. As seen in FIG. 3, the heat shrinkable plastic tube is then slit longitudinally near one edge 16 of the stripe of PSA. The slit may be made first, but it is preferable to apply the PSA first. Slitting should not be done with a hot knife to avoid premature shrinking. A second slit (not shown) may be required to remove excess tubing material on some sizes so that the pressure sensitive adhesive 11 is along one edge 16 and there is not an excess of material at the opposite edge 17. An excessive overlap of the edges may leave a free edge that curls upon heat shrinking. This happens to be needed because heat shrinkable tubing is commercially available in only certain diameters. For example, three inch and four inch diameter tubing sizes are available and there is no commercial product with an intermediate diameter.

When the cable jacket is to be used, one first selects the appropriate tubing size for the cable or other object to be jacketed. The tubing size that is appropriate is approximately twice the diameter of the cable if using a 2:1 shrink ratio material, or three times the cable diameter if one is using a 3:1 shrink ratio material. Examples of appropriate dimensions are given along with other data in Table 1 hereinafter.

It is then preferable to solvent clean the inside surface of the heat shrinkable plastic tube along slit edge 17 opposite to the edge 16 having the PSA, although it has been found that aggressive adhesives may be used which do not require solvent cleaning of the substrate. This inner surface 18 along edge 17 is the portion that will overlap and bond to the PSA.

The heat shrinkable tubing 10 is then wrapped around a cable (or other object) (not shown) so that the paper release layer 12 covering the PSA is on the outside. The size is such that edge 17 of the tube adjacent to the slit can be overlapped over the PSA. One then removes a short section of the release layer, for example about 2 to 5 cm.

Figure 4:
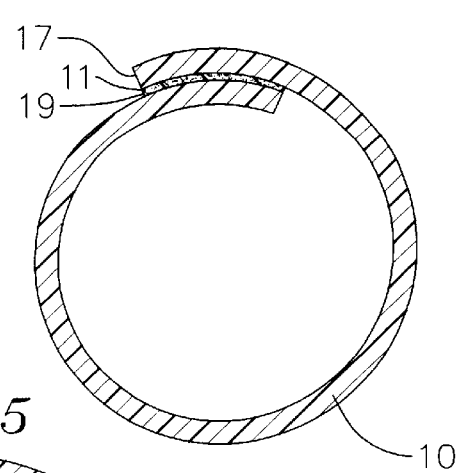
FIG. 4 is a cross-sectional view of the heat shrinkable tube of FIG. 3 having the slit ends of the tube overlapping.

Next as shown in FIG. 4, one aligns the solvent cleaned surface 18 with the edge 19 of the PSA so that all of the PSA is covered by the overlapping edge 17. For example, if the stripe of adhesive is one-half inch wide, one-half inch of the tubing adjacent the opposite side of the slit is overlapped over the PSA. Once this first short section of the overlap has been sealed or at least secured in place, one continues to remove short sections of the release paper and continues to make an overlap seal longitudinally along the tube. Once the entire length of heat shrinkable tube has been installed and the seam closed, the overlapped seam should be rubbed firmly, using a thumb or a smooth mandrel, for maximizing the contact area between the adhesive and inside surface of the overlap.

One may then shrink the tubing in place immediately since there is no cure time for the PSA, or one may choose to install multiple tubing sections prior to shrinking since there is no reasonable time limit within which the material must be shrunk. Conventional techniques are used to shrink the tubing. For example, one uses a hot air type heat gun with a temperature setting of 90°–175° C. (195°–350° F.) using a heat reflector sized appropriately for the tubing. Using a reflector is not mandatory, but not using one can result in tubing with varying wall thickness (thin spots) and/or fish eyes (cold spots). The heat shrinking operation is the same as employed for heat shrinkable tubing which has not been slit, overlapped and bonded.

Before applying any heat to the heat shrinkable tubing, one should locate the overlap seam area along the outside of any bend radius, if possible. Locating the overlap on the inside of the bend radius may result in wrinkles in the seam. If it is deemed undesirable to have the overlap on the outside of the bends, any wrinkles that form may be worked out using a smooth mandrel while the tubing is still hot.

One should begin applying heat to a portion of the heat shrinkable tubing that is several inches (e.g. 20–30 cm.) away from the tubing end. Applying heat at the tubing end first, could result in the tubing overlap seam opening up. The heat source should be directed at the overlap seam area, allowing this area to soak heat the most. As the overlap area shrinks, the edge of the tube adjacent the overlap may tend to lift off of the PSA and roll back slightly. Under normal circumstances, this edge should lay back down when fully shrunk. One may use a light finger pressure to work an area down, should the installation result in a lifted edge after full shrinking. The heat shrinkable material can be worked and formed easily while it is hot. One then allows the finished assembly to cool.

Once the heat shrunk tube has cooled down so that it is warm to the touch, one may notice a shiny, sticky area near the overlap seam. This is residual adhesive where the shrinking overlap material has pulled back slightly. This is not a problem and the excess adhesive can be removed readily by rubbing a thumb or finger along the overlap seam line. Rubbing the seam area will insure good overlap contact and the excess adhesive will ball up readily ahead of one's thumb. The result is a surface that has no sticky feel and shows no more than a slight visible shiny line.

Note that the seal line should not be solvent cleaned. The adhesive is solvent resistant, but very aggressive solvents may cause the adhesive to delaminate or may damage the heat shrinkable tubing itself.

The adhesive used in the overlap to make a seal is one that has sufficient internal cohesion, plus adhesion to the plastic of the heat shrinkable tube, to shrink with the tube when heated to the shrinking temperature of the plastic. Thus, the overlap width shrinks along with the tubing as the adhesive deforms in shear and the stripe of PSA becomes thicker. As an example, a three quarter inch overlap seam before shrinking a 2:1 shrink ratio tube, shrinks to three eighths inch width.

Heat shrinkable tubing made from polyolefin homopolymer or copolymer, Kynar (PVDF) fluoropolymer and Viton Fluoropolymer are resistant to chemical attack and concomitantly are difficult to bond to with adhesive. A high strength acrylic pressure sensitive adhesive with a high degree of tackiness is preferred. An adhesive having a peel adhesion to polypropylene of at least 100 Newtons/100 mm (per ASTM Test D3330) is preferred. The adhesive must retain adhesion at temperatures up to about 175° C. and be able to deform in shear at temperatures of more than 90° C. to conform to the shrinking forces by the tubing as it shrinks.

A suitable adhesive is available from 3M Identification and Converter Systems Division, St. Paul, Minn. Their adhesive series number is 300LSE. This is available in a variety of widths and thickness. A preferred material is 3M 9672LE having a thickness of 125 microns. As purchased, the material has a 165 micron thick, coated kraft paper release layer. Such a material has peel adhesion of at least 126 Newtons/100 mm at room temperature on polypropylene. It has a shear strength averaging about 25 pounds per linear inch. It is suitable for heat shrinking polyolefin, Kynar and Viton tubing since it is usable for short periods up to 175° C. Heating the adhesive in the overlap seam, may actually increase the adhesion to the polyolefin tubing, particularly if the seam is pressed while warm.

Other pressure sensitive adhesives which are less heat resistant may be quite suitable for vinyl heat shrinkable tubing where heat shrinking is typically at a minimum temperature of 105° C. as compared with 120° C. for polypropylene tubing.

It is preferable to employ heat shrinkable tubing properly sized for the cable or other object to be jacketed. If the tubing is too large it will not be tight on the cable, even when at its maximum shrink. On the other hand, if the tubing is too small, it will close against the cable before it is completely shrunk and the resulting wall thickness will be too thin for good abrasion resistance. Furthermore, if there is residual shrinkage after the side opening cable jacket is shrunk tight against the cable, the overlapped seam may pull apart.

The following Table 1 illustrates the dimensions used to create a side entry heat shrinkable tubing to cover a range of cable diameters from ⅛ to 2 inches. For larger sizes the tubing has a shrink ratio of 2:1 and for the three smallest sizes, the shrink ratio is 3:1. The second column in the table shows the nominal size of the tubing after shrinking (recovered) The third column shows the original size of the heat shrinkable tubing used to manufacture a side entry jacket. These are the commercially available sizes. As mentioned above, for some sizes it is desirable to have a double slit to narrow the slit tubing (i.e., reduce its circumference) and avoid excessive overlap when wrapped around a cable. The fourth column of the table indicates the width of material trimmed off the slit tubing to achieve a desired shrunk size without excessive overlap. The fifth column of the table shows the width of the stripe of pressure sensitive adhesive (PSA) applied along one edge of the slit tube. As will be apparent, this equals the width of the overlap when the unshrunk tubing is assembled on a cable as described above. All dimensions in Table 1 are in inches.

TABLE 1

| Cable Size | Size (recovered) | Nominal Original Size (expanded) | Trim width | PSA width | Shield width |
|---|---|---|---|---|---|
| 1.876–2.000 | 2.0 | 4.0 | 0 | ¾ | 9¾ |
| 1.751–1.875 | 1⅞ | 4.0 | 0 | 1.0 | 9¼ |
| 1.626–1.75 | 1¾ | 4.0 | ½ | 1.0 | 8½ |
| 1.501–1.625 | 1⅝ | 4.0 | 1½ | 1.0 | 8 |
| 1.376–1.500 | 1½ | 4.0 | 2.0 | 1.0 | 7½ |
| 1.251–1.375 | 1⅜ | 4.0 | 2½ | 1.0 | 6⅞ |
| 1.126–1.250 | 1¼ | 3.0 | ½ | 1.0 | 6¼ |
| 1.001–1.125 | 1⅛ | 3.0 | 1.0 | 1.0 | 5⅝ |
| .876–1.00 | 1.0 | 3.0 | 1½ | 1.0 | 5⅛ |
| .751–.875 | ⅞ | 2.0 | 0 | ¾ | 4½ |
| .626–.750 | ¾ | 2.0 | ¼ | 1.0 | 4 |

TABLE 1-continued

| Cable Size | Size (recovered) | Nominal Original Size (expanded) | Trim width | PSA width | Shield width |
|---|---|---|---|---|---|
| .501–.625 | 5/8 | 1½ | 0 | ¾ | 3⅜ |
| .376–.500 | ½ | 1½ | ½ | ¾ | 2¾ |
| .251–.375 | ⅜ | 1.0 | 0 | ¾ | 2⅛ |
| .189–.250 | ¼ | 0.944 (3:1) | 0 | ½ | 1½ |
| .126–.188 | 3/16 | 0.709 (3:1) | 0 | ½ | 1¼ |
| < or = .125 | ⅛ | 0.709 (3:1) | ½ | ½ | 1 |

Thus, for example, when a cable to be jacketed has a diameter of about ⅝ inch, the original tube size before slitting is 1½ inch diameter. A ¾ inch wide stripe of adhesive is applied on the outside of the tubing and when assembled before shrinking, the overlap is ¾ inch wide. Thus, the nominal diameter of the tube after assembly on the cable and before shrinking is about 1¼ inch.

Figure 5:
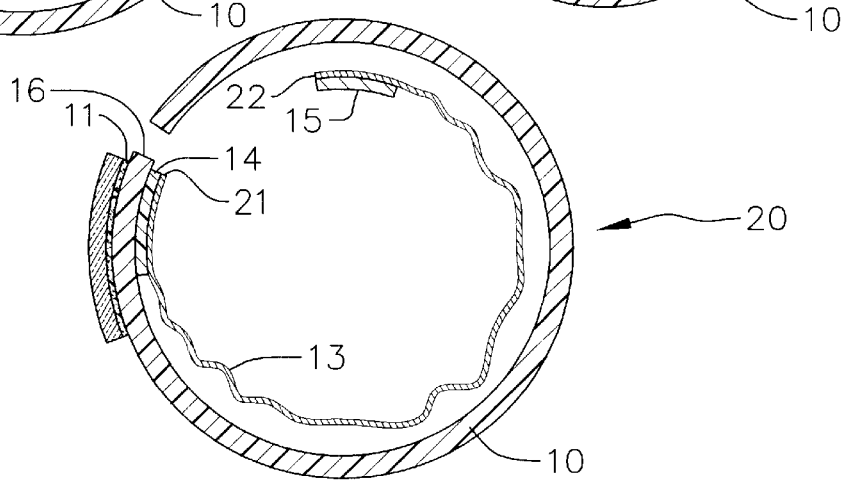
FIG. 5 is a first alternative embodiment of the heat shrinkable tube of the present invention.

FIG. 5 illustrates an embodiment of side opening heat shrinkable cable jacket 20 which also includes means for providing electrical shielding for a cable for inhibiting electromagnetic interference (EMI). In this embodiment, the heat shrinkable plastic tube 10, stripe of PSA 11 and layer of release paper 12 are the same as previously described. A strip of electrically conductive fabric 13 extends longitudinally along the inside of the tube. An edge of the electrically conductive fabric is bonded to the inside of the tube using a layer of the same adhesive material 14 used on the outside of the tubing. The edge 21 of the conductive fabric is aligned with along the edge 16 of the slit, inside from the layer of PSA 11 on the outside. The layer of electrically conductive fabric is otherwise loose within the heat shrinkable tubing. A thin stripe of adhesive 15 is laminated to the longitudinal edge 22 of the conductive fabric opposite to edge 21 that is adhesively bonded to the inside of the tube. This adhesive stripe is used to bond the edge of the conductive fabric to the electrical cabling (not shown) being covered. Bonding the edge 22 of the fabric to the cable and then wrapping the shielding and heat shrinkable jacket around the cable assures that the conductive fabric longitudinal edges overlap by about ¼ of the cable circumference once the tubing has been fully shrunk, thereby minimizing or avoiding electromagnetic leakage. The user may attach a grounding lead such as metal braid or wire directly to the conductive fabric by soldering prior to tubing installation if a drain wire is required by the user's design.

The final column in Table 1 shows preferred widths of the shielding material attached inside the heat shrinkable material. These widths are sufficient for providing overlap of the shielding to assure no EMI leakage.

When the shielded heat shrinkable cable jacket is used, it is wrapped around the cable as described above, except that the conductive fabric is also wrapped around and bonded to the cable after removing a paper release layer. The adhesive stripe 15 along the edge of the shielding fabric holds the fabric in place around the cable. When the tubing is shrunk, as described above, the shrinking plastic tends to draw the opposite longitudinal edges of the fabric together to assure that there is overlap of the fabric for minimizing electromagnetic interference. It will be noted that the width of the fabric is less than the inside circumference of the tube before shrinking since greater widths are not necessary for assuring overlap when the tubing is shrunk. The conductive fabric has a width greater than the inside diameter of the cable jacket when heat shrunk.

A suitable electrically conducted fabric (but not the only one) is a polyester taffeta fabric electroplated with copper and nickel. Such a fabric is available from Advanced Performance Materials, St. Louis, Mo., as their Flectron fabric, Part No. 3035-213.

A side entry heat shrinkable tube as described may be used in short or long lengths. It can be used in short lengths to provide spot protection around corners or in places where abrasion is likely to occur. It may be used in long lengths on assemblies where large diameter hardware precludes the use of tubing and the assembly must be slid through the tubing. It may provide significant labor savings over long lengths of conventional heat shrinkable tubing since it eliminates the difficulties associated with fishing wire or cable through long lengths of conventional tubing. It may also be used to repair damaged EMI shielding cables. In addition it may provide a simple means of adding EMI shielding to cable assemblies which are found to require shielding after they have been fabricated or installed. It may also be used to patch places in shielding that have been damaged.

Although the present invention has been described and illustrated with respect to the embodiments thereof, it is to be understood that the invention is not to be so limited since changes and modifications may be made therein which are within the full intended scope of the invention as hereinafter claimed.

What is claimed is:

1. A side opening heat shrinkable cable jacket comprising:

a tube of heat shrinkable plastic having a longitudinal slit;

a first stripe of pressure sensitive adhesive bordering one edge of the slit on the outside of the tube, the adhesive having sufficient internal cohesion and adhesion to the plastic tube to shrink with the tube when heated to a shrinking temperature of the plastic;

a release layer over the first stripe of pressure sensitive adhesive; and a longitudinally extending strip of electrically conductive fabric bonded to the inside of the tube along an edge of the slit, the conductive fabric is bonded to the inside of the tube by a second stripe of pressure sensitive adhesive, and a third stripe of pressure sensitive adhesive is disposed along an edge of the strip opposite the second stripe of pressure sensitive adhesive and on an inside surface of the strip, facing an object to be jacketed.

2. The cable jacket of claim 1 wherein the first adhesive is a high strength acrylic pressure sensitive adhesive.

3. A method of forming a side opening heat shrinkable cable jacket comprising the steps of:

applying a first stripe of pressure adhesive longitudinally along a heat shrinkable plastic tube, the first stripe of adhesive being covered with a release layer;

slitting the heat shrinkable tube longitudinally along an edge of the first stripe of adhesive;

bonding a strip of electrically conductive fabric to the inside of the jacket by applying a second stripe of pressure sensitive adhesive along a first edge of the strip of electrically conductive fabric; and bonding a second edge of the strip of electrically conductive fabric to an object to be jacketed, by applying a third stripe of pressure sensitive adhesive to the second edge of the strip opposite the second stripe of pressure sensitive adhesive.

4. A method according to claim 3 wherein the first adhesive has sufficient internal cohesion and adhesion to the plastic of the tube to shrink with the tube when heated to the shrinking temperature of the plastic.

5. A method according to claim 3 wherein the tube is slit before the first stripe of adhesive is applied.

6. A method for forming an elongated heat shrinkable jacket comprising the steps of:

wrapping a longitudinally slit tube of heat shrinkable plastic around an object to be jacketed;

overlapping edges of the tube adjacent to the slit;

adhesively bonding an inner surface of an outer edge of the overlapped tube to an outer surface of an inner edge of the overlapped tube to form overlapped edges;

heating the tube, including the overlapped edges and adhesive to heat shrinking temperature of the tube; and bonding an second edge of an electrically conductive fabric strip, which is opposite a first edge that is bonded to an inside surface of the elongated heat shrinkable jacket by a first stripe of adhesive, to the object to be jacketed by a second stripe of adhesive, before wrapping the slit tube of heat shrinkable plastic to the object.

* * * * *